US012198466B2

(12) United States Patent
Guérin

(10) Patent No.: US 12,198,466 B2
(45) Date of Patent: Jan. 14, 2025

(54) FACE DETECTION IN SPHERICAL IMAGES USING OVERCAPTURE

(71) Applicant: GoPro, Inc., San Mateo, CA (US)

(72) Inventor: Guillaume Matthieu Guérin, Chatillon (FR)

(73) Assignee: GoPro, Inc., San Mateo, CA (US)

( * ) Notice: Subject to any disclaimer, the term of this patent is extended or adjusted under 35 U.S.C. 154(b) by 891 days.

(21) Appl. No.: 17/215,408

(22) Filed: Mar. 29, 2021

(65) Prior Publication Data

US 2021/0303824 A1 Sep. 30, 2021

Related U.S. Application Data

(60) Provisional application No. 63/002,803, filed on Mar. 31, 2020.

(51) Int. Cl.
*G06V 40/16* (2022.01)
*G06T 7/00* (2017.01)

(52) U.S. Cl.
CPC ............. *G06V 40/167* (2022.01); *G06T 7/97* (2017.01); *G06T 2207/20081* (2013.01); *G06T 2207/20084* (2013.01); *G06T 2207/30201* (2013.01)

(58) Field of Classification Search
CPC ............... G06V 40/167; G06T 7/97; G06T 2207/20081; G06T 2207/20084; G06T 2207/30201
See application file for complete search history.

(56) References Cited

U.S. PATENT DOCUMENTS

| | | | | |
|---|---|---|---|---|
| 2002/0122113 | A1* | 9/2002 | Foote | G06T 5/80 348/48 |
| 2017/0094169 | A1* | 3/2017 | Yoshikawa | G06T 3/4038 |
| 2018/0270428 | A1* | 9/2018 | Nose | G06V 40/172 |
| 2019/0082103 | A1* | 3/2019 | Banerjee | G06T 7/50 |
| 2021/0289118 | A1* | 9/2021 | Guérin | H04N 23/698 |
| 2022/0078328 | A1* | 3/2022 | Kazama | H04N 23/55 |
| 2022/0092729 | A1* | 3/2022 | Steel | G06T 3/073 |
| 2022/0108559 | A1* | 4/2022 | Derbanne | H04N 23/45 |
| 2023/0058472 | A1* | 2/2023 | Leroy | H04N 23/71 |
| 2023/0292011 | A1* | 9/2023 | Hori | H04N 23/698 |

* cited by examiner

*Primary Examiner* — Bobbak Safaipour
(74) *Attorney, Agent, or Firm* — Young Basile Hanlon & MacFarlane, P.C.

(57) ABSTRACT

Face detection in a spherical image is performed using overcapture. Multiple views of a spherical image are separately processed using face detection, and results of the face detection for those views are projected to a format for further processing of the spherical image.

20 Claims, 9 Drawing Sheets

FACE DETECTION IN SPHERICAL IMAGES USING OVERCAPTURE

CROSS REFERENCE TO RELATED APPLICATION(S)

This application claims priority to and the benefit of U.S. Provisional Application Patent Ser. No. 63/002,803, filed Mar. 31, 2020, the entire disclosure of which is hereby incorporated by reference.

TECHNICAL FIELD

This disclosure relates to face detection in spherical images using overcapture, in particular, to performing facial detection within multiple overcapture views of a spherical image.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be processed and then stored or output. In some cases, the ISP may be used to capture multiple images or video frames which are spatially adjacent or otherwise include overlapping content

SUMMARY

This disclosure describes, inter alia, systems and techniques for face detection in spherical images using overcapture.

One aspect of this disclosure is an image capture device. The image capture device comprises a first image sensor arranged in a first direction, a second image sensor arranged in a second direction opposing the first direction, a memory configured to store instructions for using overcapture to perform face detection for a spherical image, and a processor configured to execute the instructions to generate a first image using the first image sensor and a second image using the second image sensor, produce the spherical image by combining the first image and the second image, identify multiple overcapture views for the spherical image, perform face detection against image data of the multiple overcapture views to detect at least one face within at least one of the multiple overcapture views, and obtain output associated with the at least one face corresponding to the at least one of the multiple overcapture views.

Another aspect of this disclosure is a method. The method, using one or more processors, includes identifying multiple overcapture views for a spherical image. A first portion of a face is detected within a first overcapture view of the multiple overcapture views and a second portion of the face is detected within a second overcapture view of the multiple overcapture views. An indication of the face is projected to a portion of the spherical image corresponding to the first overcapture view and the second overcapture view. The spherical image and the indication of the face are then output for further processing, storage, or display.

Yet another aspect of this disclosure is an image processor. The image processor comprises a first processing unit and a second processing unit. The first processing unit is configured to produce a spherical image by combining a first image generated using a first image sensor arranged in a first direction and a second image generated using a second image sensor arranged in a second direction opposing the first direction. The second processing unit is configured to detect a face within one or more overcapture views of multiple overcapture views identified for the spherical image and projects an indication of the face to a format associated with the spherical image.

These and other aspects of the present disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
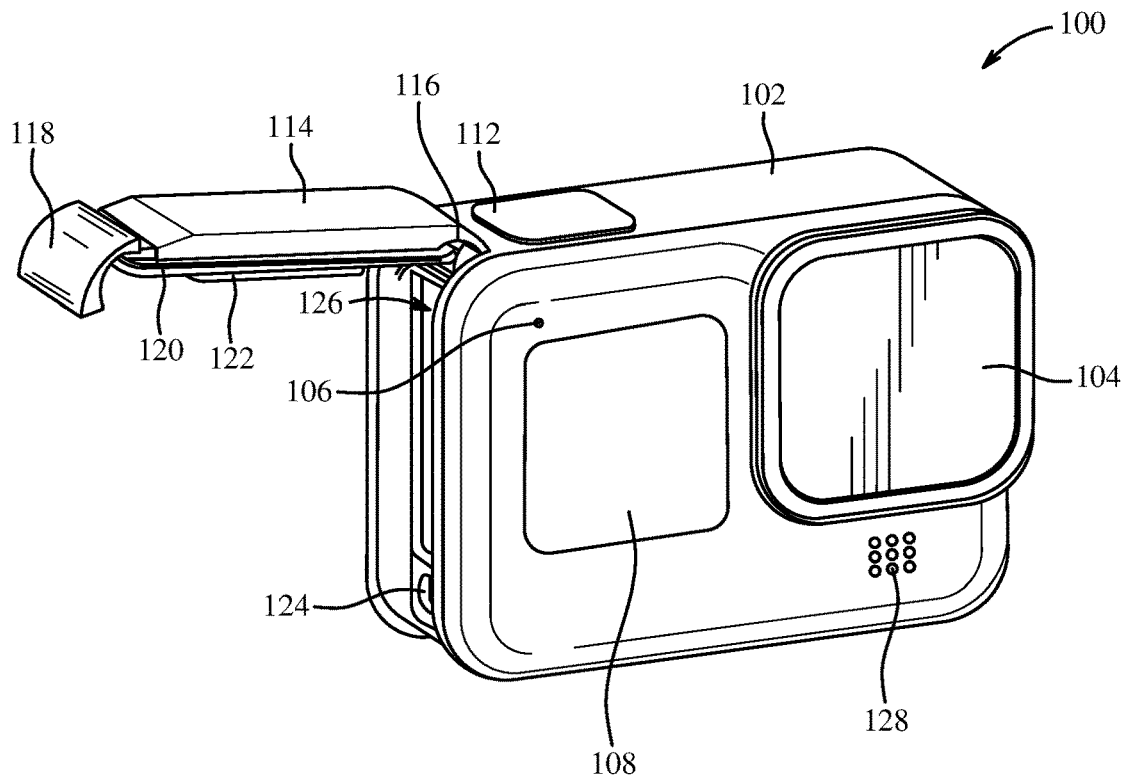
FIGS. 1A-B are isometric views of an example of an image capture device.

Image capture devices are designed with numerous features to assists users in producing high quality images. One example of such a feature is the ability to combine two or more images into a single, composite image. A typical example of a composite image is a two-dimensional panoramic image, which is typically produced by horizontally combining two images to show a larger scene than could be shown by a single image alone. Combining two or more subject images to produce a composite image requires careful processing of those images, such as to ensure that the juxtaposed portions of each respective subject image are aligned properly and with minimal distortion.

One approach to combining images in this way is image stitching. Image stitching is the process of combining multiple images with overlapping fields-of-view to produce a composite image. Image stitching may include aligning the pixels of two images being combined in a region along a boundary between sections of a composite image that are respectively based on two different input images. The resulting line or lines of pixels forming the overlapping portion between those two images is referred to as a stitch line. The stitching may be passively performed (e.g., by a processing component of the image capture device or another device), such as automatically upon the capturing of the subject images. Alternatively, the stitching may be in response to user intervention, such as by a user of the image capture device selecting to combine the subject images.

Another example of a composite image which may be produced using image stitching is a spherical image, which may also be referred to as a 360 degree image. A spherical image is a composite image formed by stitching two or more images having overlapping fields of view such that the resulting image shows a complete 360 degree field-of-view around the image capture device used to capture those two or more images. For example, a spherical image may be produced by stitching two or more images captured using fisheye lenses. Improvements in image capture technology have made spherical images increasingly popular. For example, spherical images are frequently used to show a full environmental rendering of a scene, such as to immerse a viewer in the environment. In another example, spherical images are used to produce virtual reality experiences.

As with conventional two-dimensional images, spherical images may be processed using one or more techniques to identify and/or enhance the content thereof. One example of such processing is face detection, in which an image is processed to detect the presence of human faces within the image. In the context of a spherical image, face detection includes processing each view to determine whether a face is present. Since there may be several views stitched together to form the spherical image (e.g., six views, such as where a cube map projection is applied), conventional face detection techniques would require substantially more resources to process a spherical image than a typical two-dimensional image.

There may be several drawbacks to using conventional face detection techniques on a spherical image. First, it may be computationally expensive and take a large amount of computing resources away from other image processing aspects. That is, face detection performed against a conventional two-dimensional image can become computationally expensive with a single view. The use of as many as six views for a spherical image can thus burden the computing system. Second, because there may be distortion introduced in the spherical image at or near the stitch lines, a conventional face detection technique may not be able to positively identify a face appearing at or near a stitch line. For example, the image stitching performed to produce the spherical image may introduce distortion within the stitched images, such as on each side of a stitch line. The distortion along the boundaries of the stitched images may limit the efficacy of face detection for the spherical image, such as by obscuring faces located within regions within which such distortion is introduced, even if the faces are not located directly on a stitch line.

Implementations of this disclosure address problems such as these by using overcapture for face detection processing in spherical images. Generally, overcapture refers to the processing of image data, particularly within a spherical format, from its original format into another format using one or more views of the image data. Each of the views represents a portion of the image data transformed from the spherical format to another format. Multiple views of a spherical image are separately processed in this way using face detection, and results of the face detection for those views are projected to a format for further processing of the spherical image. For example, in some implementations, multiple overcapture views are identified for the spherical image in which each of the overcapture views represents low-resolution image data within a portion of the spherical image, which portion may be overlapping or non-overlapping with portions corresponding to other overcapture views. Face detection is performed against image data within the multiple overcapture views. Output indicating results of the face detection is then projected to respective locations of the spherical image corresponding to the multiple overcapture views within which faces are detected.

The implementations of this disclosure are herein described with respect to images captured using an image capture device. However, the implementations of this disclosure may also be used for or otherwise adapted to processing videos captured using an image capture device. For example, an image captured using an image capture device as described herein may refer to a frame of a video, such as a frame of a 360 degree video, captured using the image capture device. Accordingly, the implementations of this disclosure may further cover implementations which are used for face detection of spherical video content using overcapture.

The implementations of this disclosure are described in detail with reference to the drawings, which are provided as examples so as to enable those skilled in the art to practice the technology. The figures and examples are not meant to limit the scope of the present disclosure to a single implementation, and other implementations are possible by way of interchange of, or combination with, some or all of the described or illustrated elements. Wherever convenient, the same reference numbers will be used throughout the drawings to refer to same or like parts.

Figure 1B:
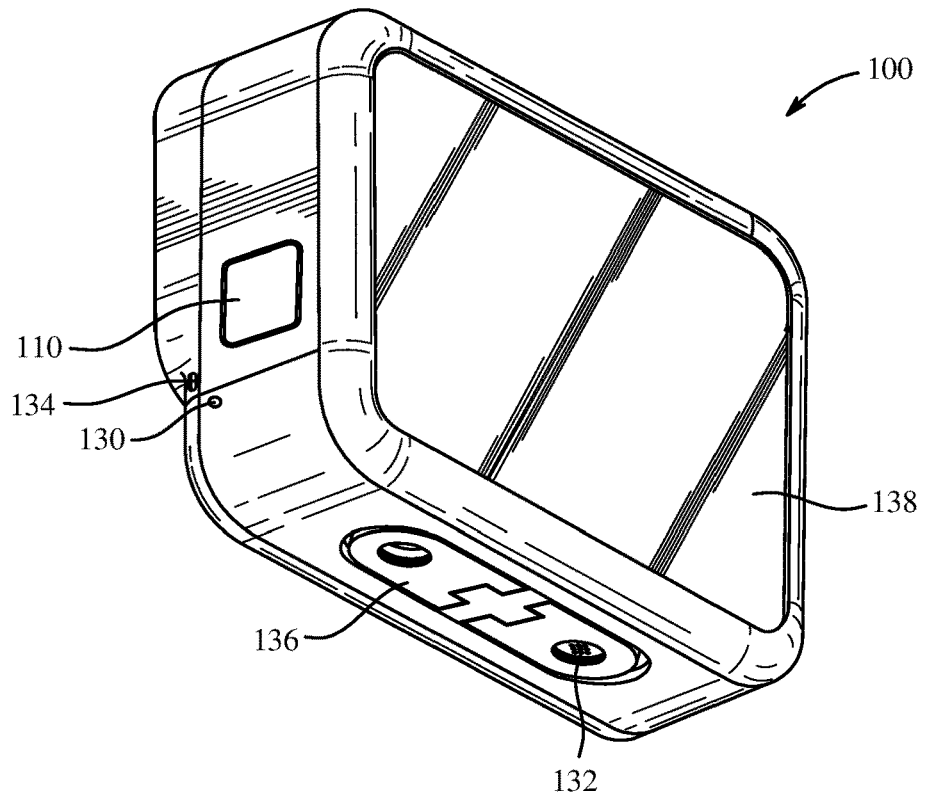

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown)

for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (FPS)), a location setting, and/or a context setting, which may indicate an activity, such as mountain biking, in response to user input, and may communicate the settings, or related information, to the image capture device 100.

Figure 7:
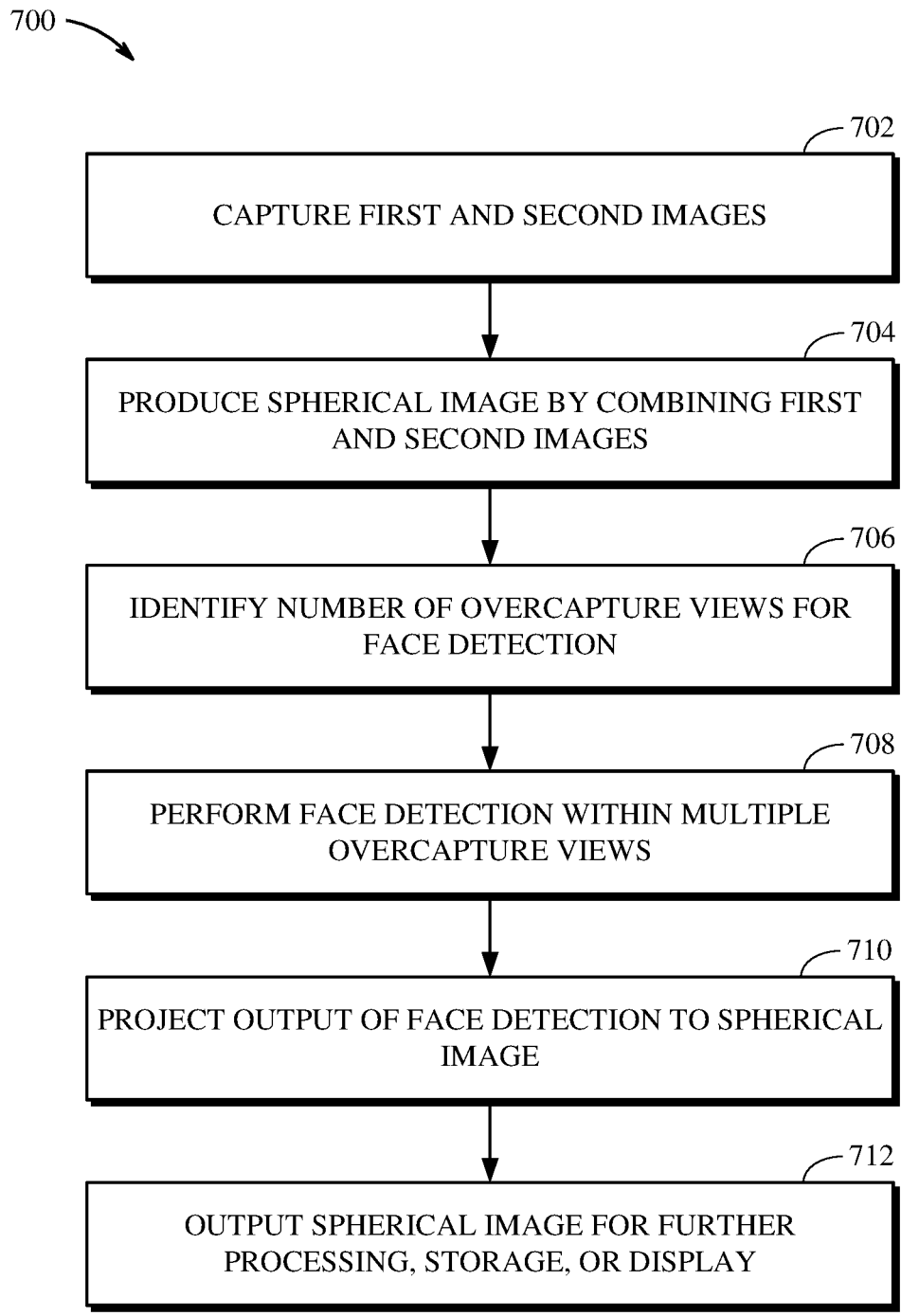
FIG. 7 is a flowchart showing an example of a technique for face detection in a spherical image using overcapture.

The image capture device 100 may be used to implement some or all of the techniques described in this disclosure, such as the technique 700 described in FIG. 7.

Figure 2A:
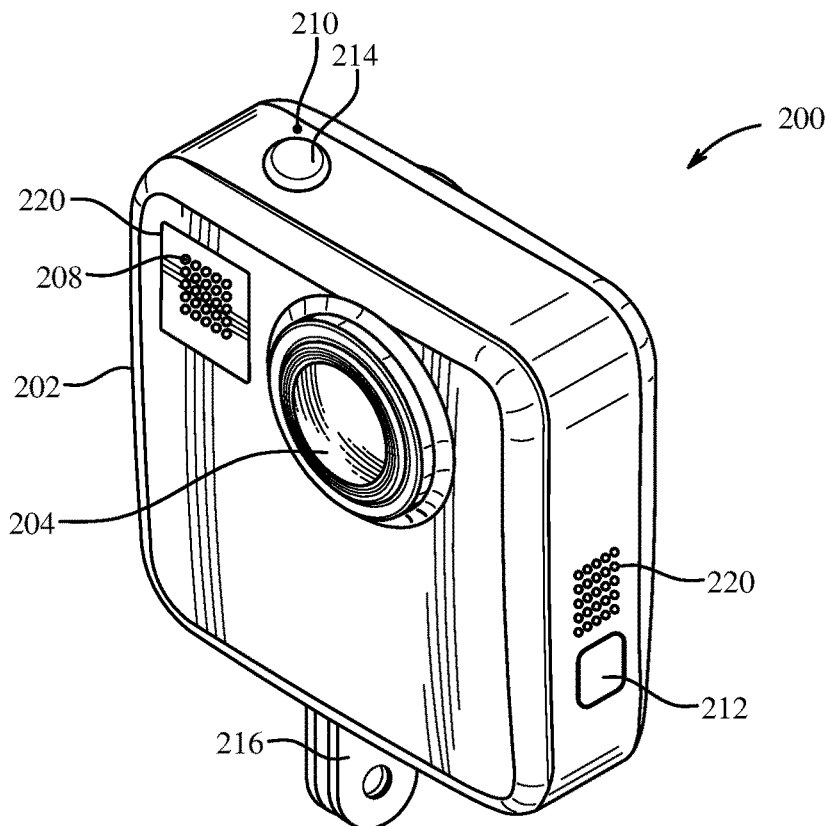
FIGS. 2A-B are isometric views of another example of an image capture device.
Figure 2B:
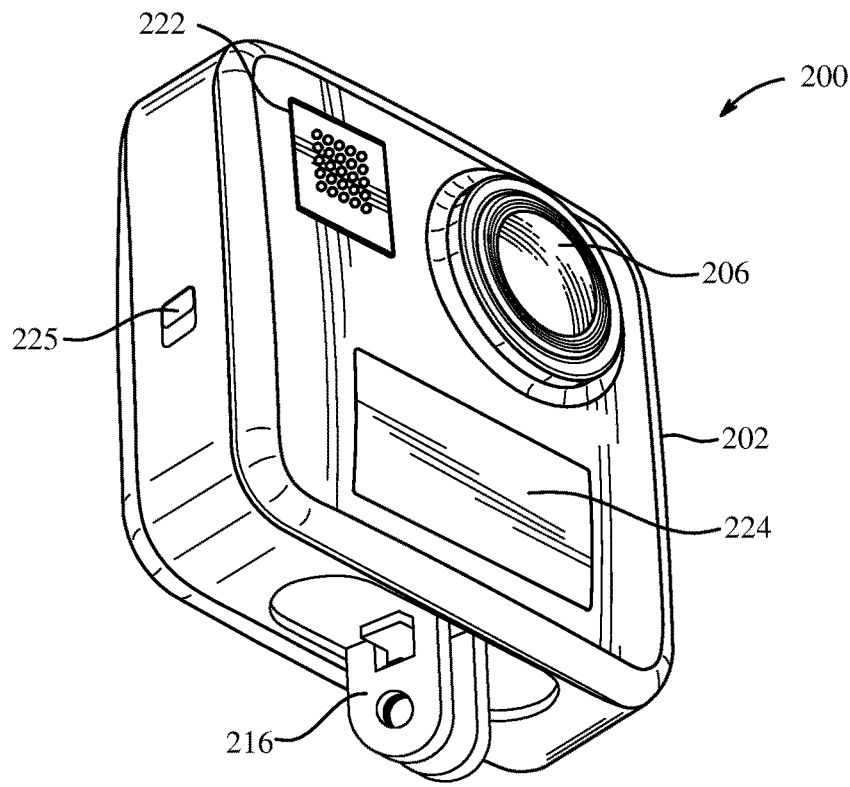

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
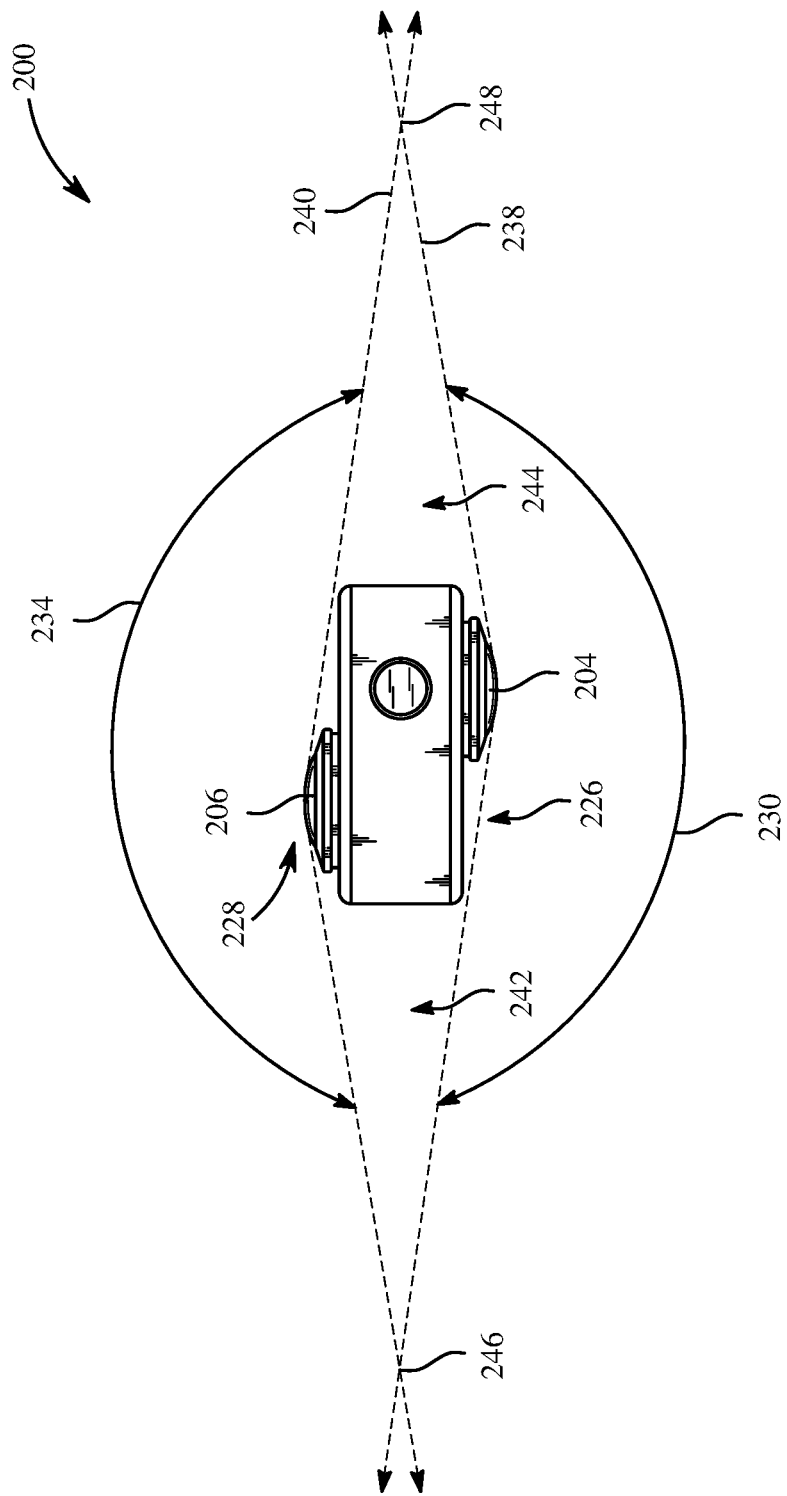
FIG. 2C is a top view of the image capture device of FIGS. 2A-B.
Figure 2D:
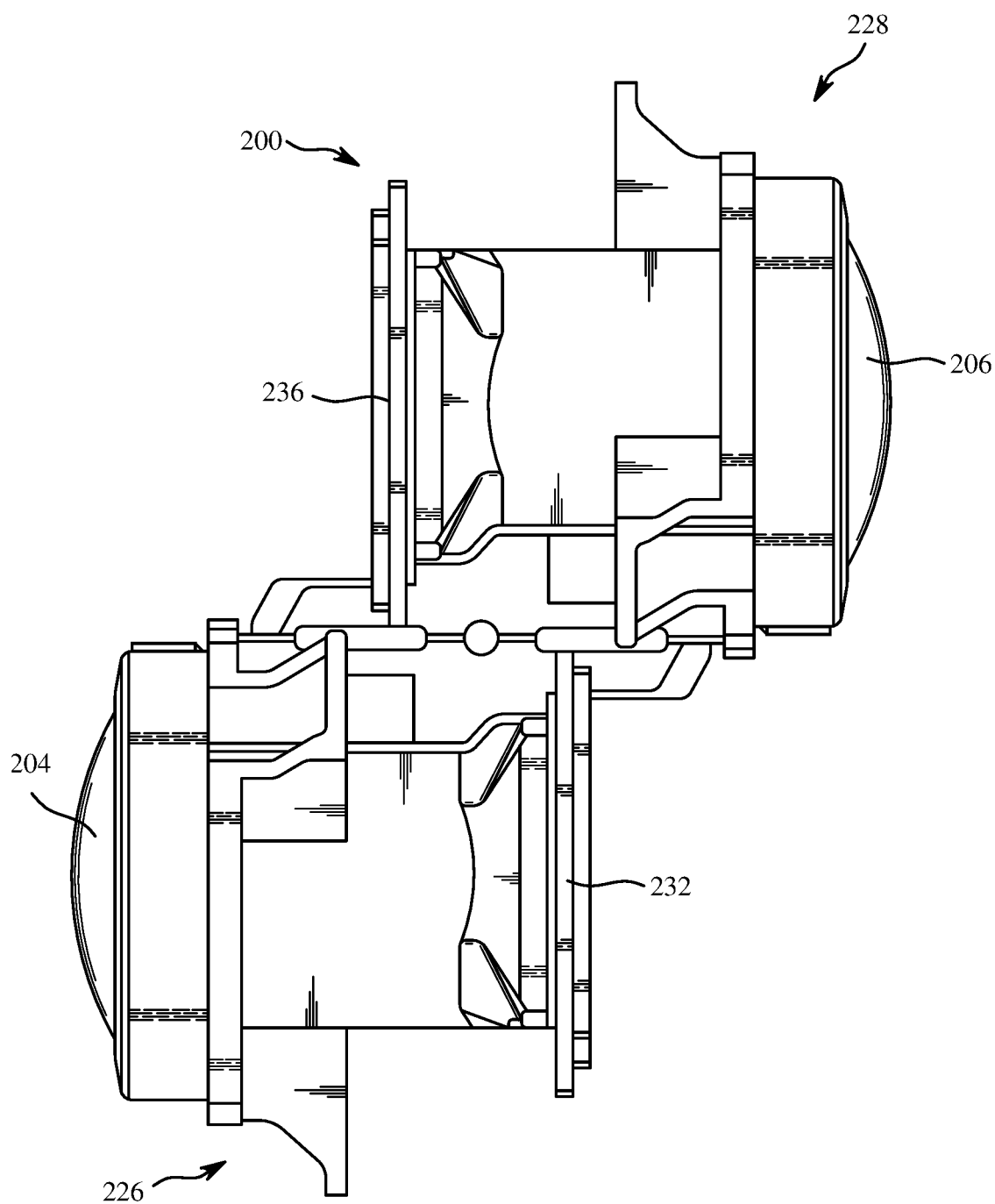
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 700 described in FIG. 7.

Figure 3:
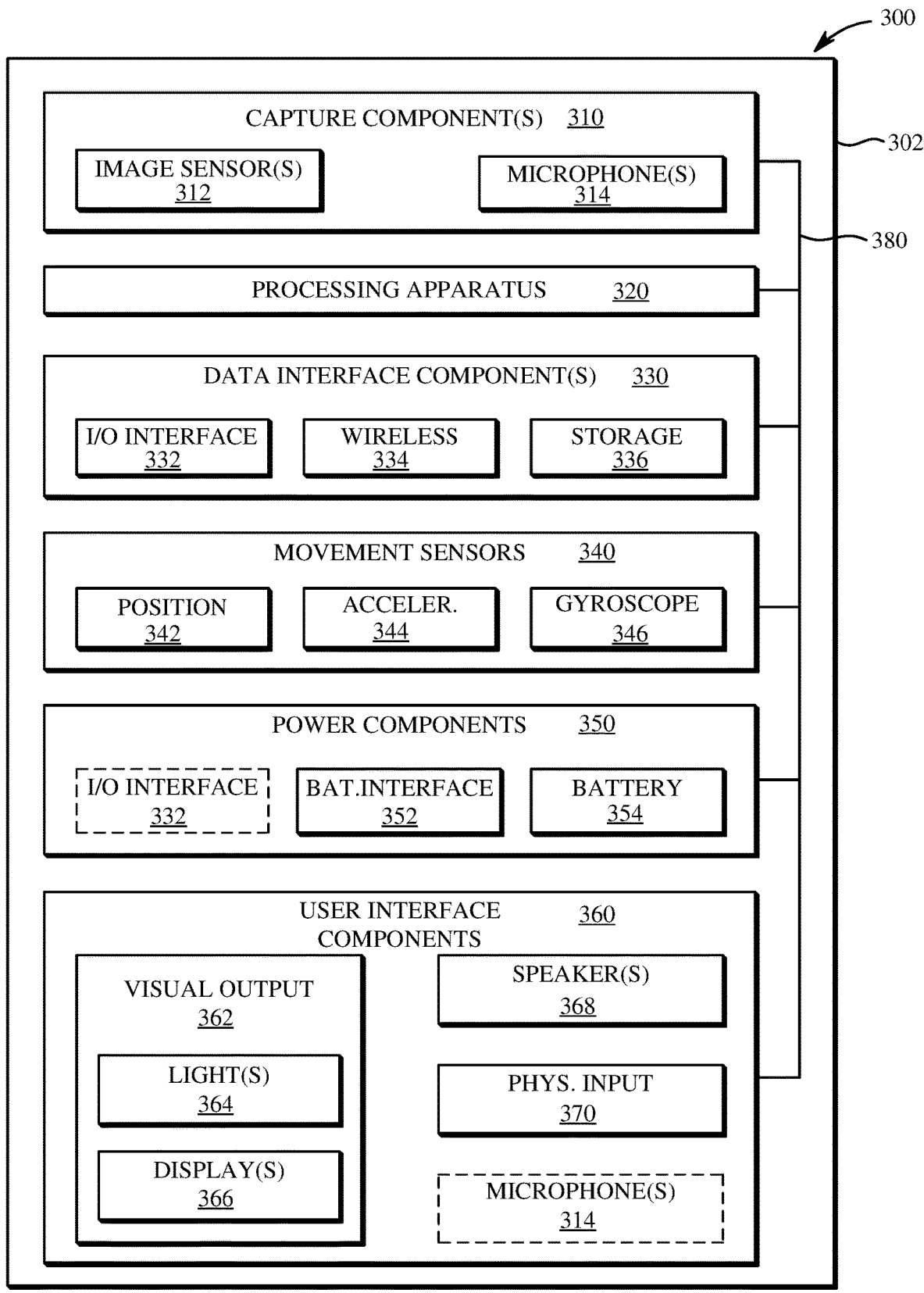
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a nontransitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 700 described in FIG. 7.

Figure 4:
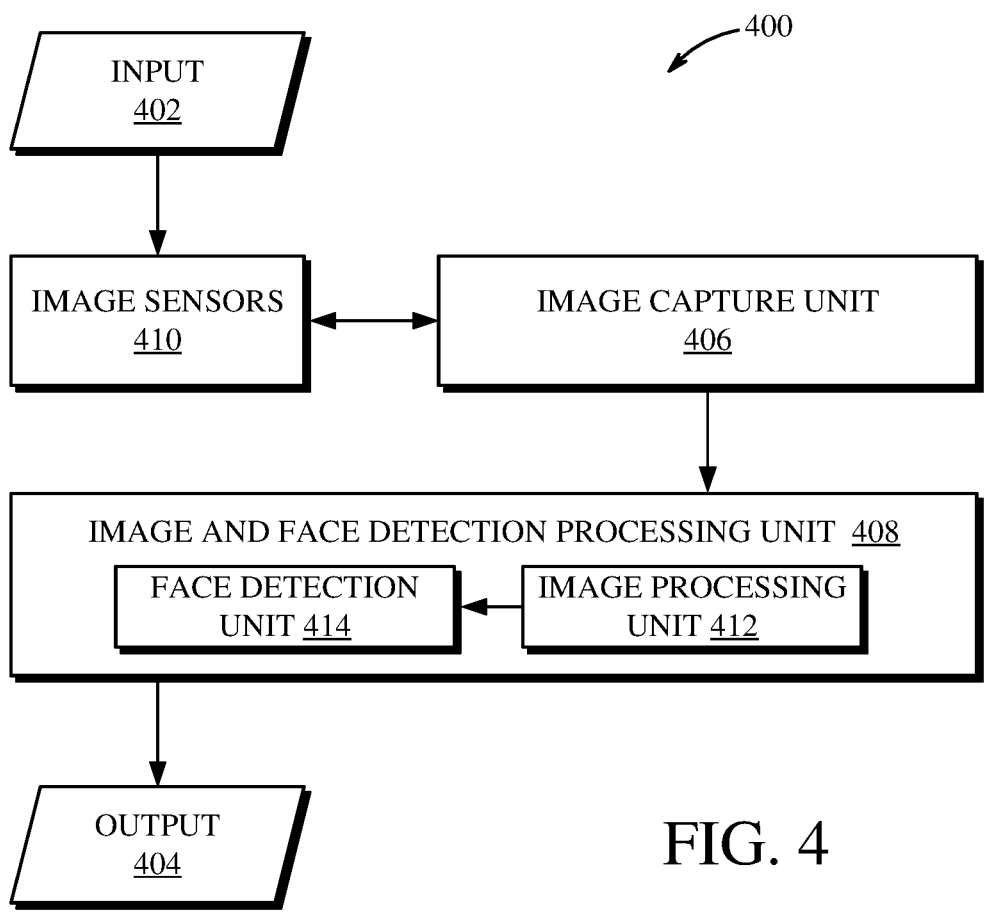
FIG. 4 is a block diagram of an example of an image capture and processing pipeline.

FIG. 4 is a block diagram of an example of an image capture and processing pipeline 400. The pipeline 400 is implemented by an image capture device, which may, for example, be the image capture device 100 shown in FIGS. 1A-B, the image capture device 200 shown in FIGS. 2A-D, the image capture device 300 shown in FIG. 3, or another image capture device. In some implementations, some or all of the pipeline 400 may represent functionality of a DSP and/or an ASIC, for example, including an image capture unit, an image processing unit, or a combined image capture and processing unit.

The pipeline 400 receives input 402 and processes the input 402 to produce output 404 using an image capture unit 406 and an image and face detection processing unit 408. The input 402 includes information or measurements usable to capture images using the image capture unit 406. For example, the input 402 may include measurements and/or other information used by the image capture unit 406 to capture images. For example, the input 402 may refer to hemispherical images or like images generated using 360 degree field-of-view image sensors, such as where each of the images is produced based on a greater than 180 degree field-of-view. In another example, the input 402 may refer to one or more images generated using other fields-of-view.

The input 402 is captured using image sensors 410 controlled using the image capture unit 406 and thereafter processed using the image and face detection processing unit 408 to produce the output 404, which may be a spherical image resulting from the processing of the input 402. Alternatively, the output 404 may refer to information associated with that image, for example, indications of detected faces within that image.

The image sensors 410 are image sensors of an image capture device. For example, each of the image sensors 410 may be an image sensor of the image capture device 100, an image sensor of the image capture device 200, and/or an image sensor of the image capture device 300. Capture functionality of the image sensors 410 may be controlled by or using the image capture unit 406. For example, the image capture unit 406 may interface with the image sensors 410 and communicate commands, instructions, or the like to cause the image sensors 410 to capture images based on the input 402. In some implementations, the image capture unit 406 may include the image sensors 410. In some implementations, the image capture unit 406 may control additional components beyond the image sensors 410. For example, the image capture unit 406 may refer to one or more components used to capture an image by the image capture device 100, the image capture device 200, and/or the image capture device 300.

The image and face detection processing unit 408 processes the images captured using the image capture unit 406 using image stitching and face detection techniques. The image and face detection processing unit 408 includes an image processing unit 412 and a face detection unit 414. In some implementations, the image processing unit 412 and the face detection unit 414 may be or refer to a single unit which performs one set of operations against the images captured using the image capture unit 406.

The image processing unit 412 performs image processing against the images captured using the image capture unit 406 based on the input 402. In particular, the image processing unit 412 processes those images by combining them to produce a spherical image. Producing the spherical image may include combining the captured images using image stitching. Stitching the images can include identifying regions of the images which overlap and combining the images at those regions. For example, the overlapping regions can be identified based on luminance distribution statistics which are similar within each of the images. For example, the luminance distribution statistics may indicate one or more image objects, background features, or other visual depictions within the images.

In another example, the overlapping regions can be identified based on the fields of view of the image sensors used to capture the images. For example, the image processing unit 412 may be configured to recognize image data located within certain locations of an image as being within an overlapping region due to the field of the view of the image sensor used to capture the image. In some cases, after the spherical image is produced, the image processing unit 412 can further process the image by blending pixels within regions of overlap. This may include the image processing unit 412 adjusting one or more exposure and/or contrast differences or settings for the image. Stitching the images of the input 402 together results in a seamless spherical image.

The face detection unit 414 receives the spherical image produced using the image processing unit 412. The face detection unit 414 performs face detection against the spherical image to detect one or more faces within the spherical image. In particular, the face detection unit 414 is configured to detect one or more faces within the spherical image using overcapture. Using overcapture to perform face detection against a spherical image includes using a number of overcapture views to process portions of image data of the spherical image. The number of overcapture views to use to perform the face detection can be determined based on an overcapture dimensional definition. The overcapture dimensional definition indicates the horizontal and vertical degrees to use for an overcapture. The total number of overcapture views can thus be determined based on how many overcaptures are required to cover the full sphere of the spherical image. For example, an overcapture dimensional definition of 120 degrees horizontal by 90 degrees vertical would require twelve overcapture views.

In some implementations, the image processing unit 412 determines the number of overcapture views to use for performing face detection against the spherical image. In such an implementation, operations for determining the number of overcapture views to use for performing face detection against the spherical image may be omitted from the face detection unit 414.

Using overcapture to perform face detection against the spherical image thereafter further includes projecting output representing the results of the face detection from some or all of the overcapture views to a format for further processing and/or display of the image data of the spherical image. The format may to which the output is projected may, for example, be the spherical image itself, a cube map projection of the spherical image, an equirectangular projection of the spherical image, an equiangular cube map of the spherical image, a rotated sphere projection of the spherical image, or another format.

The particular format to which the output of the face detection is projected may be determined by warping the images earlier combined to produce the spherical image. For example, the warping can include transforming the images into the spherical space using a projection scheme (e.g., a cube map projection, equirectangular projection, equiangular cube map projection, or rotated sphere projection). That transformation may include utilizing depth measurements for the images to minimize visual artifacts for viewpoint difference. The determination of the format to which to project the output of the face detection may be performed at or using the image processing unit 412, the face detection unit 414, or both.

The output 404 is produced after the projection of the face detection results to the format for the spherical image. The output 404 may be the format to which the face detection results are projected. Alternatively, the output 404 may be data associated with such a format after projection of the face detection results. In some implementations, the face detection unit 414 may begin processing the images captured using the image capture unit 406 before the image processing unit 412 has completed its processing. For example, the image processing unit 412 and the face detection unit 414 can simultaneously process the captured images. For example, information determined using the face detection unit 414 may be fed back into the image processing unit 412, such as to change one or more aspects of the image processing. For example, information relating to the expected locations of faces within the captured images may be passed from the face detection unit 414 to the image processing unit 412. The image processing unit 412 may then use that information to render certain portions of the spherical image first or using different resolution configurations.

Figure 5:
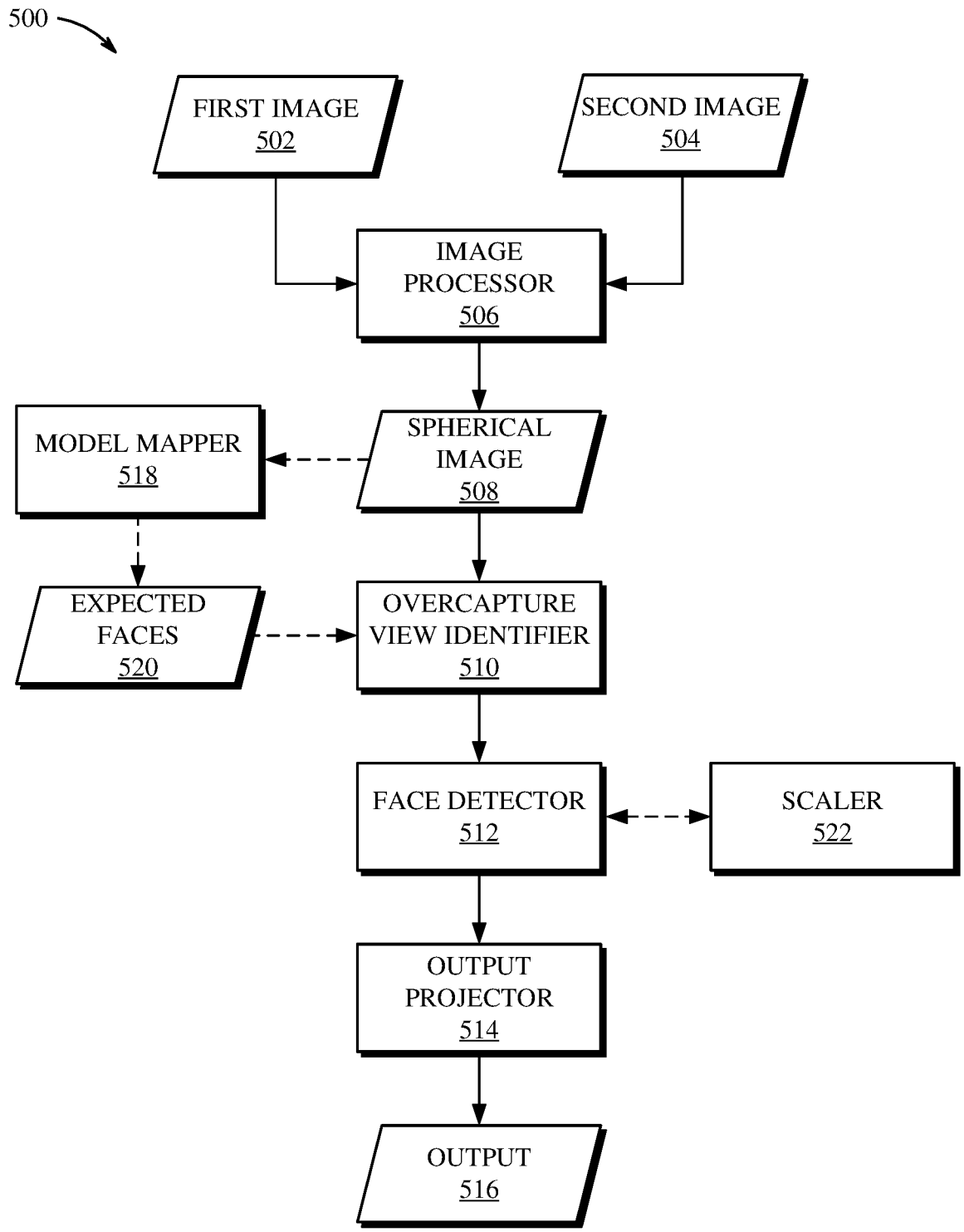
FIG. 5 is a diagram of an example of a data sequence based on face detection processing for a spherical image using overcapture.

FIG. 5 is a diagram of an example of a data sequence 500 based on face detection processing for a spherical image. The data sequence shown and described with respect to FIG. 5 may represent functionality of computing units of an image capture and processing pipeline, for example, the image capture and processing pipeline 400 shown in FIG. 4.

The data sequence 500 begins with the capturing of a first image 502 using a first image sensor and the capturing of a second image 504 using a second image sensor. The first image sensor and the second image sensor are image sensors of an image capture device. The first image sensor may be arranged in a first direction and the second image sensor may be arranged in a second direction opposite to the first direction. The first image sensor and the second image sensor may have a greater than 180 degree field-of-view.

An image processor 506 processes the first image 502 and the second image 504 to produce a spherical image 508. The image processor 506 produces the spherical image 508 by combining the first image 502 and the second image 504 along a stitch line at each boundary between the first image 502 and the second image 504.

An overcapture view identifier 510 processes the spherical image 508 to identify multiple overcapture views to use for face detection. The overcapture views have horizontal and vertical degree dimensions (e.g., 120 degrees horizontal by 90 degrees vertical). The overcapture views may be two-dimensional M×N-sized windows, where M and N may be the same or a different number. The windows may be of a fixed size. Alternatively, the windows may be of varying sizes. Alternatively, the overcapture views may have dimensions or forms other than in two-dimensions. For example, the overcapture views may be curved or otherwise warped representations of image data.

The overcapture view identifier 510 may use configurations defined for the face detection processing to determine the number of overcapture views to identify for the face detection. For example, a configuration may be an overcapture dimensional definition indicating the size of the overcapture views (e.g., 120 degrees horizontal by 90 degrees vertical). In another example, a configuration may indicate whether the overcapture views are to be overlapping or non-overlapping. Other examples are possible.

A face detector 512 performs face detection within each of the overcapture views identified using the overcapture view identifier 510. For example, the face detector 512 can process pixel values of the image data corresponding to a given overcapture view according to the luminance distributions of those pixel values and thereafter compare those pixel values using pattern analyzers to determine whether the pixel values depict some or all of a face. The face detector 512 performs region of interest processing within each of the overcapture views to search for faces within the image data of the spherical image 508 corresponding to those overcapture views. The face detection algorithm applied using the face detector 512 may be developed specifically for use with spherical images. Alternatively, the face detection algorithm applied using the face detector 512 may be device-agnostic or format-agnostic.

An output projector 514 projects output representing the results of the face detection performed using the face detector 512 to a format for the spherical image data. For example, the output projector 514 may project the output representing the results of the face detection to a format of the overcapture views used for the face detection. For example, the format to which the face detection results are projected may be an equirectangular projection, an equiangular cube map, a rotated sphere projection, or another format. In another example, the output projector 514 may project the output representing the results of the face detection back to the spherical image 508 itself.

Responsive to the projection of the face detection results, output 516 is generated and made available for further processing, storage, and/or display. The output 516 can include one or more of the spherical image 508 with the projected face detection output included, regardless of format, another data structure including the projection of the face detection results, and/or data or other indications of the faces or portions of faces detected the spherical image 508. For example, the output 516 may be the output 404 shown in FIG. 4.

Implementations of the data sequence 500 may differ from what is shown and described with respect to FIG. 5. In some implementations, the data sequence may include a model mapper 518. For example, the model mapper 518 may map probabilities of the spherical image to determine expected face detection statistics for one or more portions of the spherical image 508. In this way, the model mapper 518 can assess probabilities indicating the likely locations of one or more faces within the spherical image 508. The model mapper 518 may use a learning model, such as a neural network, a deep learning model, a linear or logistical regression, a support vector machine, a Bayesian network, a decision tree, a genetic algorithm, or another model, to map the probabilities of the spherical image 508.

As output from the model mapper 518, expected faces 520 indicative of the expected locations of faces in the spherical image 508 may then be available to the overcapture view identifier 510. For example, the overcapture view identifier 510 may use the expected faces 520 to identify overcapture views for locations along a sphere of the spherical image 508, which locations correspond to the locations of the expected faces 520. In some such implementations, the output 516 or information related to the output 516 which indicates the actual locations of the faces detected in the spherical image 508 may be used to update a learning model used by the model mapper 518, such as by verifying whether the expected faces 520 accurately represented the faces actually detected in the spherical image 508.

In some implementations, particularly in which non-overlapping overcapture views are used for the face detection, the data sequence 500 may include a scaler 522. For example, the face detector 512 may search through a first overcapture view to determine that a first portion of a face is shown, but that a second portion of the face is not shown. The face detector 512 may further identify a second portion of the face within a second overcapture view adjacent to the first overcapture view. In some cases, the first portion of the face and the second portion of the face may be differently sized, such as due to warping, transformation, or other processing applied against the image data of the spherical image 508. In such an implementation, the scaler 522 can determine a scaling factor by which to adjust a visual representation of one portion of the face within the respective overcapture view to cause both portions of the face to be of the same or of substantially the same size. The scaler 522 may not adjust the image data ultimately output for viewing, but rather temporarily adjust the image data used for the face detection processing.

Figure 6:
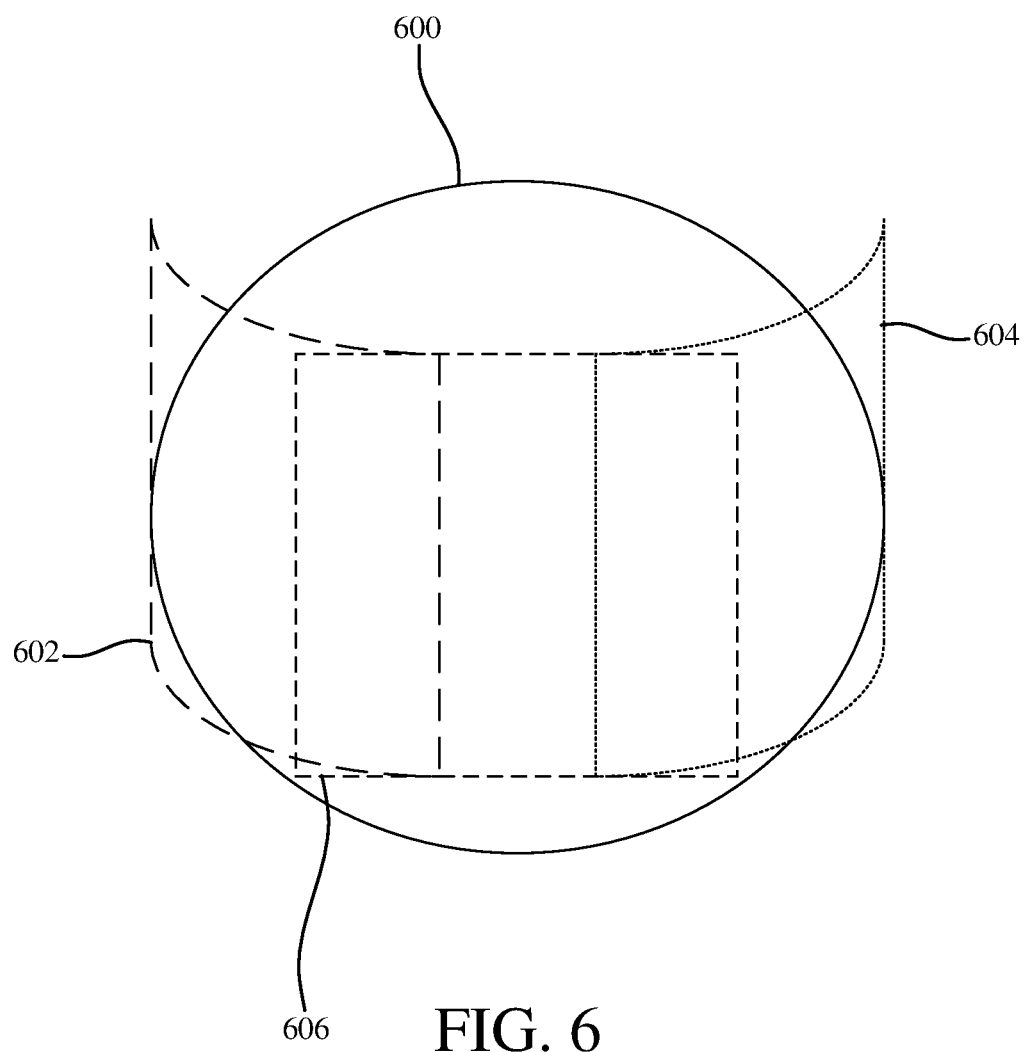
FIG. 6 is an illustration of examples of multiple overcapture views identified for a spherical image.

FIG. 6 is an illustration of examples of multiple overcapture views identified for a spherical image 600. The spherical image 600 can be produced by combining a first image captured using a first image sensor and a second image captured using a second image sensor. For example, the spherical image 600 may be the spherical image 508 described with respect to FIG. 5. The spherical image 600 is a 360 image including image data along the surface of the sphere. Overcapture views 602, 604, and 606 each correspond to a different portion of the surface of the spherical image 600 and therefore include different image data. As shown, the overcapture views 602, 604, and 606 are overlapping such that both the overcapture view 602 and the overcapture view 606 include a common portion of image data of the spherical image 600 and such that both the overcapture view 604 and the overcapture view 606 include a different common portion of image data of the spherical image 600. In some implementations, where the overcapture views are non-overlapping, each of the overcapture views includes entirely different portions of image data of the spherical image.

Further details of implementations and examples of techniques performed using the systems, devices, and pipelines described with respect to FIGS. 1A-5 are now described. FIG. 7 is a flowchart showing an example of a technique 700 for face detection in a spherical image using overcapture. The technique 700 can be performed, for example, using hardware and/or software components of an image capture system, such as the image capture device 100 shown in FIGS. 1A-B, the image capture device 200 shown in FIGS.

2A-D, and/or the image capture device 300 shown in FIG. 3. The image capture device 100, the image capture device 200, and/or the image capture device 300 may be implemented using one or more processing units of an image capture and processing pipeline or data sequence, for example, the processing units of the image capture and processing pipeline 400 as described with respect to FIG. 4 and/or the processing units of the data sequence 500 as described with respect to FIG. 5.

In another example, the technique 700 can be performed using an integrated circuit. The integrated circuit may, for example, be a field programmable gate array (e.g., FPGA), programmable logic device (PLD), reconfigurable computer fabric (RCF), system on a chip (SoC), ASIC, and/or another type of integrated circuit. An image processor of the integrated circuit may, for example, include an image capture unit and/or an image and face detection parameter processing unit (e.g., either, a processor having one or multiple cores) configured to execute instructions to perform some or all of the technique 700.

Although the technique 700 is described with respect to a series of operations, the operations comprising the technique 700 may be performed in orders other than those described herein. In some implementations, the technique 700 may include additional, fewer, or different operations than those described herein.

At 702, a first image is captured using a first image sensor of an image capture device and a second image is captured using a second image sensor of the image capture device. The first image and the second image may, for example, be a first hemispherical image and a second hemispherical image. The first image sensor and the second image sensor may be arranged in opposing directions and may have overlapping fields of view.

At 704, a spherical image is produced. Producing the spherical image includes combining the first image and the second image, for example, by stitching the first image and the second image together. The first image and the second image may be stored in an on-board memory buffer before they are combined to produce the spherical image. Alternatively, producing the spherical image can include receiving the first image and the second image, such as from a storage on-board an image capture device which includes the image capture unit or from a storage external to the image capture device.

At 706, a number of overcapture views to use for processing the spherical image are identified. The overcapture views represent low-resolution image data within a portion of the spherical image. Multiple overcapture views will be used to process the spherical image using face detection. The particular number of overcapture views may be determined based on an overcapture dimensional definition indicating a number of degrees horizontally and vertically for overcaptures. The overcapture dimensional definition may further be determined based on whether the face detection is configured to use overlapping or non-overlapping overcaptures.

For example, fewer overcapture views may be necessary when the face detection is configured for non-overlapping overcaptures, thereby reducing the amount of computing resources used for face detection; however, using non-overlapping overcaptures may in at least some cases lead to reduced quality and efficacy of the face detection performance, such as where distortion, blurring, or other artifact introduced around boundaries of the non-overlapping overcapture views causes the face detection to not detect faces near or along those boundaries.

One or more of the overcapture views of the multiple overcapture views may include a stitch line representing a location at which the first image and the second image are adjoined. For example, an overcapture view may correspond to a portion of the spherical image at which the stitch line is located. The overcapture view may thus include image data originating from both of the first image and the second image.

At 708, face detection is performed against image data within the multiple overcapture views identified for processing the spherical image. Specifically, face detection is performed within each of the multiple overcapture views. The performance of face detection within a given multiple overcapture view may focus within a central region of that multiple overcapture view, especially in implementations in which the face detection is configured to use overlapping overcapture views. That is, the use of overlapping overcapture views may limit the likelihood of a portion of image data of the spherical image not being effectively processed using face detection. Performing the face detection may include identifying regions of interest within the multiple overcapture views based on image data included within the multiple overcapture views and thereafter processing the regions of interest to detect the faces.

In some implementations, such as where non-overlapping overcapture views are used, performing face detection against the image data within the multiple overcapture views may include detecting a first portion of a face within a first overcapture view of the multiple overcapture views along a stitch line of the spherical image which adjoins the first overcapture view and a second overcapture view of the multiple overcapture views. Based on the detection of the first portion of the face within the first overcapture view, the second overcapture view may be searched for a second portion of the face. The face is detected responsive to the detection of the first portion of the face within the first overcapture view and the detection of the second portion of the face within the second overcapture view. In some such implementations, scaling may be performed to resize or otherwise modify the representation of the first portion of the face or the second portion of the face, such as to match the other portion.

At 710, output indicating results of the face detection is projected to respective locations of the spherical image. The locations to which the output is projected correspond to overcapture views within which faces were detected as a result of the face detection performance against the image data. In particular, the output is projected according to a format for further processing or displaying the image data. For example, the format may to which the output is projected may be the spherical image itself, a cube map projection of the spherical image, an equirectangular projection of the spherical image, an equiangular cube map of the spherical image, a rotated sphere projection of the spherical image, or another format.

Projecting the output to the locations of the spherical image according to the appropriate format may first include determining the format to which to project the output. Determining the format to which to project the output may include warping the first image and the second image, such as by transforming those images using a projection scheme. The format may be a format associated with the projection scheme used to transform the first image and the second image.

At 712, the spherical image is and/or data indicative of the detected faces are output for further processing, storage, or display. For example, where the spherical image is output for further processing, the spherical image may be output in the format to which the output of the face detection is projected. In another example, where the spherical image is output for storage or display, the spherical image may be output (e.g., in a compressed or uncompressed format) in preparation for viewing by an end user. In some implementations, the spherical image may be output to or stored at a first device or data store while the data indicative of the detected face may be output to or stored at a second device.

In some implementations, probabilities indicating the likely locations of one or more faces within a spherical image may be assessed using a model, such as to potentially further improve face detection processing. For example, a learning model may be used to map probabilities of the spherical image to determine expected face detection statistics for one or more portions of the spherical image. The learning model may, for example, be a neural network, a deep learning model, a linear or logistical regression, a support vector machine, a Bayesian network, a decision tree, a genetic algorithm, or another model.

Responsive to the detection of faces by performing face detection, the learning model may be updated according to an accuracy of the mapping. For example, the actual locations of the detected faces can be compared to the expected locations of the faces as indicated using the learning model. In this way, the learning model may be further trained or otherwise modified after the face detection. In some such implementations, the mapping of the probabilities using the learning model may occur before the number of overcapture views to use for the face detection is identified. For example, the number of overcapture views and/or portions of the spherical image to process using overcapture views may be limited based on expectations that faces will or will not be detected in certain portions of the spherical image.

Where certain elements of these implementations may be partially or fully implemented using known components, those portions of such known components that are necessary for an understanding of the disclosure have been described, and detailed descriptions of other portions of such known components have been omitted so as not to obscure this disclosure.

In the present specification, an implementation showing a singular component should not be considered limiting; rather, this disclosure is intended to encompass other implementations including a plurality of the same component, and vice-versa, unless explicitly stated otherwise herein. Further, the disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of this disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within this disclosure.

While the above-detailed description has shown, described, and pointed out novel features of this disclosure as applied to various implementations, it will be understood that various omissions, substitutions, and changes in the form and details of the devices or processes illustrated may be made by those skilled in the art without departing from this disclosure. The foregoing description is in no way meant to be limiting, but rather should be taken as illustrative of the general principles of the technology.

What is claimed is:

1. An image capture device, comprising:
a first image sensor arranged in a first direction;
a second image sensor arranged in a second direction opposing the first direction;
a memory configured to store instructions to perform face detection for a spherical image; and
a processor configured to execute the instructions to:
generate a first image using the first image sensor and a second image using the second image sensor;
produce the spherical image by combining the first image and the second image;
identify, after the spherical image is produced, multiple overcapture views for the spherical image, wherein the spherical image is at a first resolution and each of the multiple overcapture views represents a different portion of the spherical image at a second resolution lower than the first resolution;
perform face detection against image data of the multiple overcapture views to detect at least one face within at least one of the multiple overcapture views; and
obtain output associated with the at least one face corresponding to the at least one of the multiple overcapture views.

2. The image capture device of claim 1, wherein, to perform the face detection against the image data within the multiple overcapture views, the processor is configured to execute the instructions to:
identify regions of interest within the multiple overcapture views based on the image data; and
process the regions of interest to detect the at least one face.

3. The image capture device of claim 2, wherein the processor is configured to execute the instructions to:
map, using a learning model, probabilities of the spherical image to determine expected face detection statistics for one or more portions of the spherical image, wherein at least some of the regions of interest are identified based on the mapping; and
responsive to the detection of the at least one face, update the learning model according to an accuracy of the mapping.

4. The image capture device of claim 1, wherein at least some overcapture views of the multiple overcapture views correspond to overlapping portions of the spherical image.

5. The image capture device of claim 4, wherein an overcapture view of the multiple overcapture views includes a stitch line representing a location at which the first image and the second image are adjoined.

6. The image capture device of claim 1, wherein the multiple overcapture views are non-overlapping, and wherein, to perform the face detection against the image data within the multiple overcapture views, the processor is configured to execute the instructions to:
detect a first portion of a face within a first overcapture view of the multiple overcapture views along a stitch line of the spherical image which adjoins the first overcapture view and a second overcapture view of the multiple overcapture views; and
search, based on the detection of the first portion of the face within the first overcapture view, the second overcapture view for a second portion of the face, wherein the face is detected responsive to the detection of the first portion of the face within the first overcapture view and the detection of the second portion of the face within the second overcapture view.

7. The image capture device of claim 1, wherein a number of overcapture views included in the multiple overcapture views is determined based on an overcapture dimensional definition.

8. The image capture device of claim 1, wherein the processor is configured to execute the instructions to:
project the output to one or more of the spherical image, a cube map projection of the spherical image, an equirectangular projection of the spherical image, an equiangular cube map of the spherical image, or a rotated sphere projection of the spherical image.

9. A method, comprising:
identifying, using one or more processors, multiple overcapture views for a spherical image, wherein the spherical image is at a first resolution and each of the multiple overcapture views represents a different portion of the spherical image at a second resolution lower than the first resolution;

detecting, using the one or more processors, a first portion of a face within a first overcapture view of the multiple overcapture views and a second portion of the face within a second overcapture view of the multiple overcapture views;

projecting, using the one or more processors, an indication of the face to a portion of the spherical image corresponding to the first overcapture view and the second overcapture view; and outputting, using the one or more processors, the spherical image and the indication of the face for further processing, storage, or display.

10. The method of claim 9, further comprising:
producing the spherical image by combining a first image generated using a first image sensor and a second image generated using a second image sensor, wherein the first image sensor and the second image sensor have overlapping fields of view.

11. The method of claim 10, wherein the first overcapture view or the second overcapture view includes a stitch line representing a location at which the first image and the second image are adjoined.

12. The method of claim 9, wherein a number of overcapture views included in the multiple overcapture views is determined based on an overcapture dimensional definition.

13. The method of claim 12, wherein, when the detection of the face is performed using non-overlapping overcaptures, the overcapture dimensional definition indicates to use a first number of overcapture views, and, when the detection of the face is performed using overlapping overcaptures, the overcapture dimensional definition indicates to use a second number of overcapture views that is greater than the first number of overcapture views.

14. The method of claim 9, wherein detecting the first portion of the face within the first overcapture view and the second portion of the face within the second overcapture view comprises:
performing face detection in all of the multiple overcapture views to detect the face.

15. The method of claim 14, wherein performing face detection in all of the multiple overcapture views to detect the face comprises:
identifying regions of interest within the multiple overcapture views; and
process the regions of interest to detect the face.

16. The method of claim 9, wherein projecting the indication of the face to the portion of the spherical image corresponding to the first overcapture view and the second overcapture view comprises:

projecting the indication of the face to one or more of the spherical image, a cube map projection of the spherical image, an equirectangular projection of the spherical image, an equiangular cube map of the spherical image, or a rotated sphere projection of the spherical image.

17. An apparatus, comprising:
a memory; and
a processor configured to execute instructions to:
produce a spherical image by combining a first image generated using a first image sensor arranged in a first direction and a second image generated using a second image sensor arranged in a second direction opposing the first direction; and
detect a face within one or more overcapture views of multiple overcapture views identified for the spherical image after the spherical image is produced and project an indication of the face to a format associated with the spherical image,
wherein the spherical image is at a first resolution and each of the multiple overcapture views represents a different portion of the spherical image at a second resolution lower than the first resolution.

18. The apparatus of claim 17, wherein, when the detection of the face is performed using non-overlapping overcaptures, the multiple overcapture views includes a first number of overcapture views, and, when the detection of the face is performed using overlapping overcaptures, the multiple overcapture views includes a second number of overcapture views that is greater than the first number of overcapture views.

19. The apparatus of claim 17, wherein, to detect the face within the one or more overcapture views, the processor is configured to execute the instructions to:
detect a first portion of the face within a first overcapture view of the multiple overcapture views along a stitch line of the spherical image which adjoins the first overcapture view and a second overcapture view of the multiple overcapture views; and
search, based on the detection of the first portion of the face within the first overcapture view, the second overcapture view for a second portion of the face, wherein the face is detected responsive to the detection of the first portion of the face within the first overcapture view and the detection of the second portion of the face within the second overcapture view.

20. The apparatus of claim 17, wherein, to detect the face within the one or more overcapture views, the processor is configured to execute the instructions to:
identify regions of interest within the multiple overcapture views; and process the regions of interest to detect the face.

* * * * *